United States Patent [19]

Tanaka

[11] Patent Number: 5,197,841
[45] Date of Patent: Mar. 30, 1993

[54] E-SHAPED RETAINER RING
[75] Inventor: Koichi Tanaka, Nagoya, Japan
[73] Assignee: Chubu Bearing Kabushiki Kaisha, Japan
[21] Appl. No.: 851,118
[22] Filed: Mar. 16, 1992

Related U.S. Application Data

[63] Continuation of Ser. No. 487,087, Mar. 2, 1990, abandoned.

[30] Foreign Application Priority Data

| Mar. 8, 1989 | [JP] | Japan | 1-53683 |
| Jul. 4, 1989 | [JP] | Japan | 1-78327[U] |
| Jul. 18, 1989 | [JP] | Japan | 1-183603 |

[51] Int. Cl.$^5$ .............................. F16B 21/18
[52] U.S. Cl. ..................... 411/522; 411/353; 411/539; 411/354
[58] Field of Search ............... 411/352, 353, 354, 522, 411/523, 524, 539, 540, 541; 403/261, 326

[56] References Cited

U.S. PATENT DOCUMENTS

| 857,227 | 6/1907 | Booth | 411/354 |
| 2,016,858 | 10/1935 | Hall | 411/522 |
| 3,297,916 | 1/1967 | Wright | 411/522 |
| 4,886,408 | 12/1989 | Killian et al. | 411/522 |

FOREIGN PATENT DOCUMENTS

1218041 1/1971 United Kingdom ................. 70/370

*Primary Examiner*—J. J. Swann
*Attorney, Agent, or Firm*—Lowe, Price, LeBlanc & Becker

[57] ABSTRACT

An E-shaped retainer ring comprising an inner circumference that engages with a retainer ring accommodating groove formed around the circumference of a shaft; an opening through which a shaft passes when the retainer ring is mounted on and removed from the shaft; and protruding front end portions formed on each side of the opening at the outer circumference of the ring; whereby the E-shaped retainer ring is removed from the shaft by passing a tool against the protruding end portions of the ring, and the distance between the outer sides of the front end portions is set almost equal to the outer diameter of the retainer ring. A tool for fitting and removing the above E-shaped retainer ring is also provided.

2 Claims, 10 Drawing Sheets

E-SHAPED RETAINER RING

This application is a continuation of application Ser. No. 07/487,087 filed Mar. 2, 1990, now abandoned.

BACKGROUND OF THE INVENTION

The present invention relates to an E-shaped retainer ring which is mounted on a shaft and can easily be removed by a tool.

Prior Art

E-shaped retainer rings are stipulated in the Japanese Industrial Standard and those compatible with JIS standard are in general use.

Figure 1:
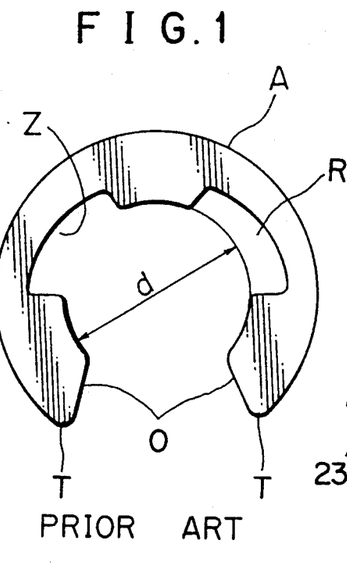
FIG. 1 is a front view of a conventional E-shaped retainer ring.
Figure 2:
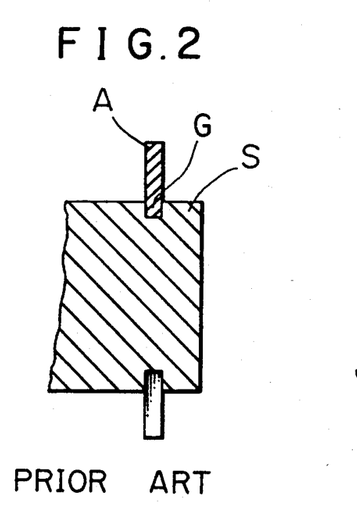
FIG. 2 is a vertical cross section of the conventional E-shaped retainer ring fitted on the shaft.

FIG. 1 shows the front view of an E-shaped retainer ring A of JIS standard for use on shafts. FIG. 2 is a cross section of the E-shaped retainer ring A fitted in a retainer ring accommodating groove G formed around the circumference of a shaft S.

The E-shaped retainer ring A is made of such materials as a spring steel or a spring stainless steel. As shown in FIG. 1, the E-shaped retainer ring has an inner diameter d slightly smaller than the outer diameter of the retainer ring accommodating groove G. The E ring is formed with recesses R on its inner circumference to allow elastic deformation to be made more easily and, at one location on the circumference, with an opening O.

The both sides of the opening O are pressed against the retainer ring accommodating groove G to resiliently expand the opening O until the E-shaped retainer ring A snaps into the retainer ring accommodating groove G (see FIG. 2). Now, the retainer ring A resiliently clamps the groove G and is thus firmly fitted on the shaft S. The E-shaped retainer ring A mounted on the shaft S has the function of positioning a part sleeved on the shaft S or prevent it from slipping off.

When the E-shaped retainer ring A is to be removed, the protruding end portions T formed at the outer circumference of the ring on each side of the opening O are pushed away from each other to expand the opening O so that the ring can be taken out of the shaft S.

Figure 3:
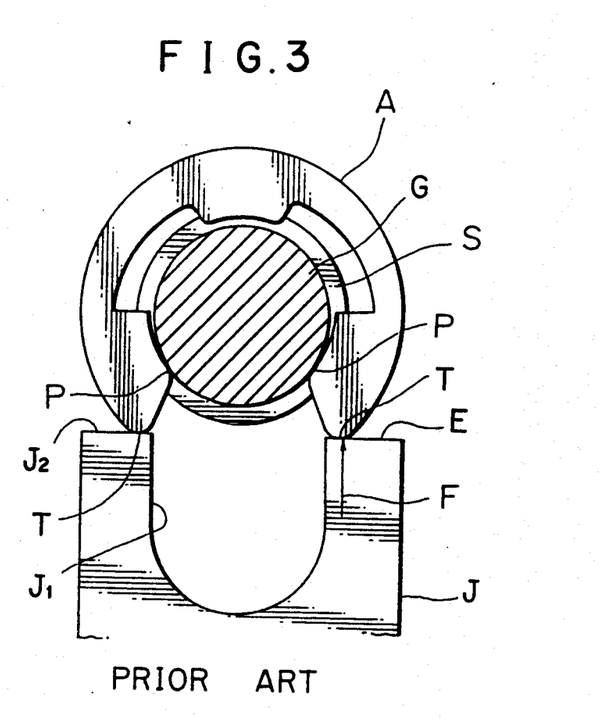
FIG. 3 is a front view of the conventional E-shaped retainer ring showing how the ring is removed from the shaft.

FIG. 3 is a partly sectioned front view showing the E-shaped retainer ring A being removed from the shaft by a tool J. The tool J has a recess J1 formed at its front center, large enough to accommodate the groove G. The tool also has press portions E at the front on each side of the recess J1 which are adapted to be pressed against the protruding end portions T.

As the press portions E are pushed by a force F against the protruding end portions T of the E-shaped retainer ring A, the inner circumference of the ring comes into contact with the groove G at points P. The contact points P on the ring then slide on the outer circumference of the ring accommodating groove G, expanding the opening O, until the E-shaped retainer ring A disengages from the shaft S.

PROBLEMS TO BE SOLVED BY THE INVENTION

To the E-shaped retainer ring A requires a large push sufficient to cause an elastic deformation of the ring A. Furthermore, since the shaft S is mounted in a narrow space inside a machine, the removal of the ring by using the tool J is no easy work.

This invention has been accomplished to overcome these drawbacks and its objective is to provide an E-shaped retainer ring which can be fitted firmly on a shaft with a large clamping force and which can also be removed easily with a small pressing force.

SUMMARY OF THE INVENTION

An E-shaped retainer ring comprising: an inner circumference that will engage with a retainer ring accommodating groove formed around the circumference of a shaft; an opening through which a shaft passes when the retainer ring is mounted on or removed from the shaft; and protruding front end portions formed on each side of the opening at the outer circumference of the ring; whereby the E-shaped retainer ring is removed from the shaft by pressing a tool against the protruding end portions of the ring, and the distance between the outer sides of the front end portions is set almost equal to the outer diameter of the retainer ring.

The E-shaped retainer ring of the above construction works as follows.

As with conventional E-retainer rings, the opening of the E-retainer ring of this invention is pressed against the ring accommodating groove on the shaft and resiliently expanded until the ring fits in the groove with a snapping force.

The opening is expanded by the deformation of the entire E-shaped retainer ring and its elasticity causes the ring to restore its original shape and thereby engage with the ring accommodating groove with a clamping force.

The E-shaped retainer ring of this invention is almost similar in shape to the conventional E-shaped retainer ring, except for the shape of the front end portions. Thus, the clamping force acting on the shaft is almost the same as the conventional ring. At the front end portions, however, the shaft clamping force is slightly larger than in the conventional ring.

The distance between the outer sides of the front end portions, on each side of the opening, of the E-shaped retainer ring is almost equal to the outer diameter of the ring. Thus, when both the front end portions are pushed by the tool, the gap expanding torque that occurs between the front end portions and the contact points between the shaft and the ring's inner circumference is larger than in the conventional ring. So, the opening is more easily expanded and thus the ring can be removed with a smaller pressing force than is required with the conventional E-shaped retainer ring.

BRIEF DESCRIPTION OF THE DRAWINGS

FIGS. 4 through 8 show embodiments of this invention;

FIGS. 9 to 17 show embodiments of a tool for fitting the E-shaped retainer ring of this invention;

FIGS. 18 to 23B show a tool for fitting and removing an E-shaped retainer ring of the present invention;

DESCRIPTION OF PREFERRED EMBODIMENTS

Embodiments of this invention will be described by referring to the attached drawings.

Figure 4:
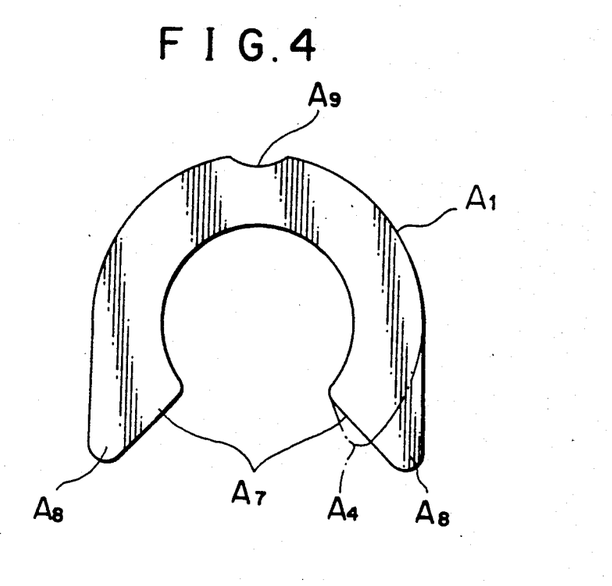
FIG. 4 is a front view of an E-shaped retainer ring A1 as one embodiment of the invention.
Figures 5, 6:
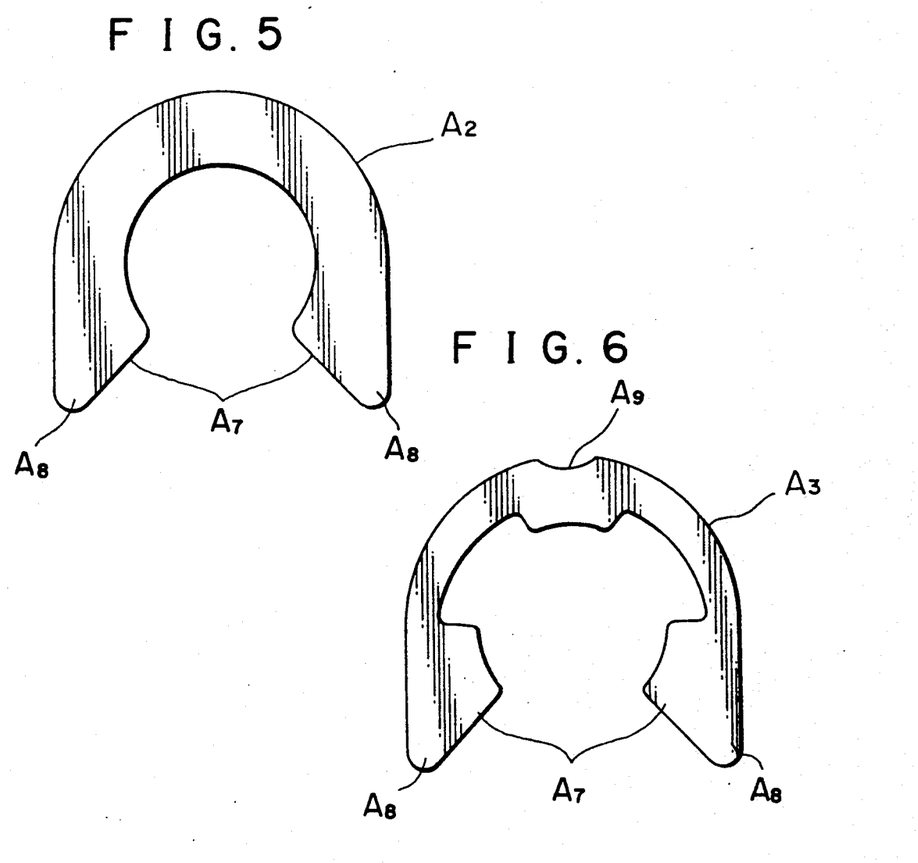
FIG. 5 is a front view of an E-shaped retainer ring A2 as another embodiment.
FIG. 6 is a front view of an E-shaped retainer ring A3 as still another embodiment.
Figure 7:
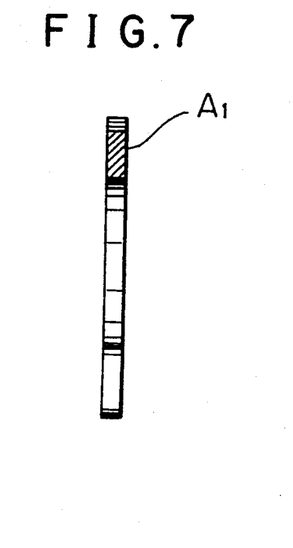
FIG. 7 is a vertical cross section of FIG. 4.

FIGS. 4 to 6 are front views of E-shaped retainer rings A1, A2, A3 according to this invention. FIG. 7 shows a vertical cross section of the ring A1.

FIG. 4 shows the E-shaped retainer ring with its opening A7 expanding outwardly. Protruding end portions A8 formed on each side of the opening A7 and on the outer circumference of the ring are projected outwardly, when compared with the conventional front end portions A4 indicated by one-dot line. The outer circumference of the E-shaped retainer ring extends straight toward the front end portions A8 in a manner maintaining its width equal to the outer diameter of the ring A1.

That is, the distance between the front end portions A8 at the outer circumference is almost equal to the outer diameter of the E-shaped retainer ring.

It is seen that the greater the distance between the outer parts of the front end portions, the easier it will be to remove the E-shaped retainer ring A1. However, since the space surrounding the E-ring on a shaft is narrow, there is an increased chance of the ring assembly work being interfered with by other adjacent parts if the end-to-end distance is increased. Also the insertion of the tool will become more difficult. Thus, the end-to-end distance is made almost equal to the outer diameter, the maximum width of the ring.

Where a spring steel or spring stainless steel is used for the E-shaped retainer ring A1, the ring may be formed with recesses R at the inner circumference, like a ring A shown in FIG. 1. Where a plastic material is used, these inner recesses R need not be formed.

A recess A9 at the back of the ring on a side opposite to the opening A7 forms a surface to receive the tip of the tool (not shown), which is used to assemble the E-ring A1 on the shaft S from a side opposite to the opening A7. The reason why the tool receiving surface 9 is formed as a recess is that the tool tip can be prevented from slipping sideways on the outer circumference of the E-ring A1, allowing the ring to be assembled easily.

The tool receiving surface A9 is not a must and may be omitted, like an E-ring A2 as shown in FIG. 5, if the tool tip is shaped in conformity with the contour of the outer circumference of the E-ring because the tool tip thus shaped will not easily slip sideways.

Now, the action of the E-rings A1 to A3 of the above constructions will be explained by referring to FIG. 8, in which the E-ring A1 is shown.

MOUNTING ON THE SHAFT

The E-ring is assembled on the shaft S in a way similar to that in the conventional E-ring. The back of the ring A1 opposite to the opening A7 is pushed by the tool (not shown) to press the opening A7 against the ring accommodating groove G on the shaft S. As a result, the surfaces of the opening A7 being pressed against the shaft S are acted upon by components of a force that will expand the opening A7, deflecting the entire ring A1 and resiliently expanding the gap of the opening A7, until the ring A1 firmly fits on the groove G.

The E-shaped retainer ring A1 is similar in shape to the conventional one and has the clamping force on the shaft almost equal to that of the conventional ring. At the front end portions A8, the clamping force is slightly larger.

REMOVING FROM THE SHAFT

Figure 8:
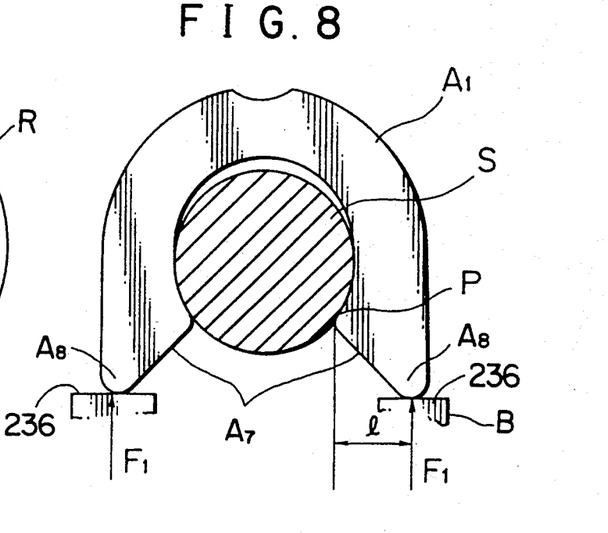
FIG. 8 is a front view of the E-shaped retainer ring A1 showing how the ring is removed from the shaft.

Referring to FIG. 8, as the press portions 236 of the tool J are pressed against the front end portions A8 of the ring with a force F1, the inner circumference of the ring A1 comes into contact with the ring accommodating groove G on the shaft S at points P. The contact points P are applied with a moment of F1 x l, causing the opening A7 of the ring A1 to be expanded.

The pressing force F1 required to remove the ring A1 is therefore smaller than the force F needed for the conventional ring A, making the removal of the ring A1 easier.

ADVANTAGES OF THE INVENTION

Since the E-shaped retainer ring of this invention is constructed as described above, the pressing force required to remove the ring is reduced while the ring's clamping force on the shaft slightly increases. This makes easier the hitherto difficult work to remove the E-shaped retainer ring from the shaft installed in a narrow space inside a machine.

Figure 9:
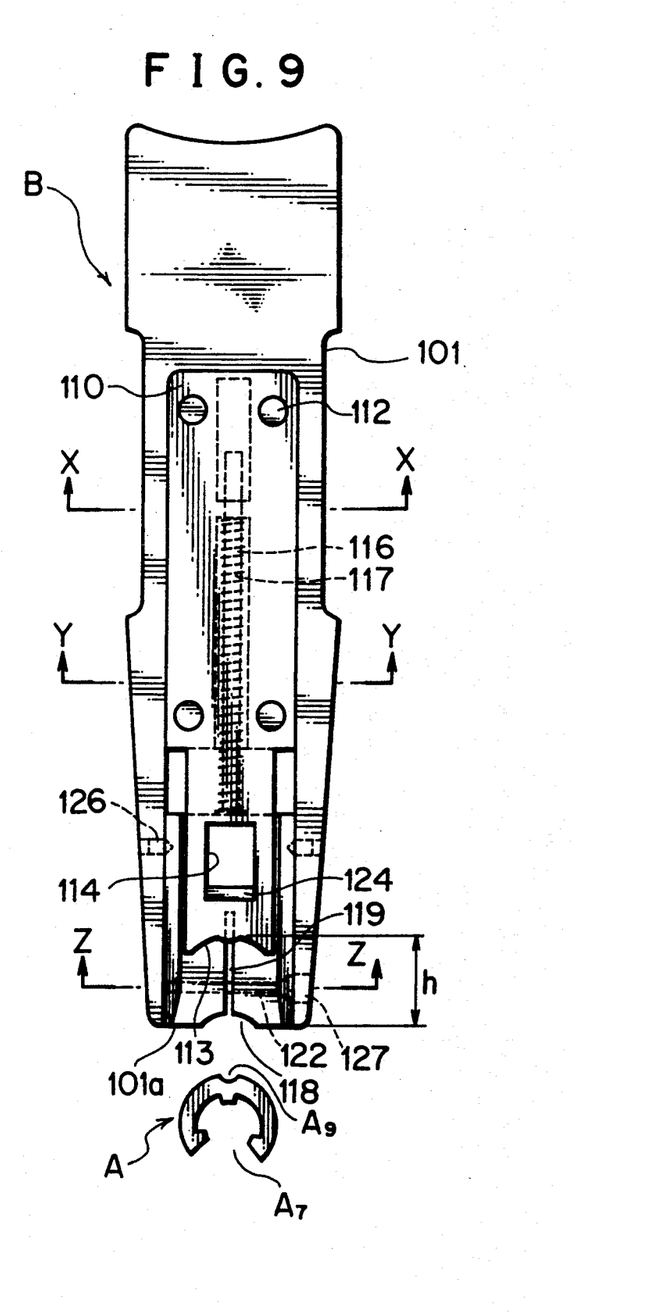
FIG. 9 is a front view of a retainer ring fitting tool.
Figure 10:
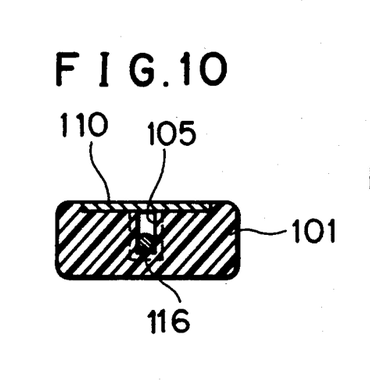
FIG. 10 is a cross section taken along the line X—X of FIG. 9.
Figure 11:
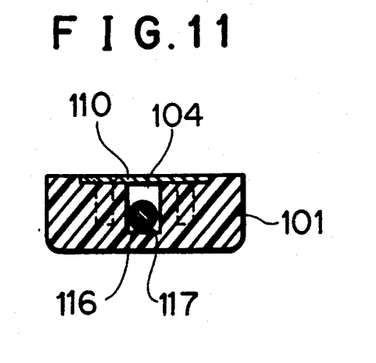
FIG. 11 is a cross section taken along the line Y—Y of FIG. 9.
Figure 12:
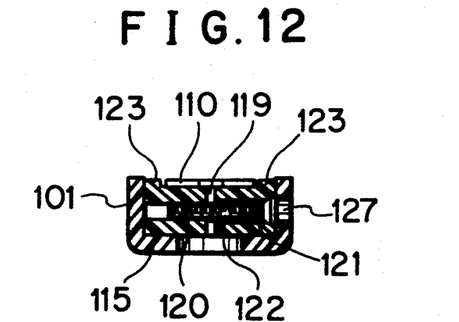
FIG. 12 is a cross section taken along the line Z—Z of FIG. 9.

FIG. 9 is a front view of a retainer ring fitting tool B of this invention; FIG. 10 is a cross section taken along the line X—X of FIG. 9; FIG. 11 is a cross section taken along the line Y—Y of FIG. 9; FIG. 12 is a cross section taken along the line Z—Z of FIG. 9; and FIG. 13 is a perspective view of the exploded retainer ring fitting tool.

Figure 13:
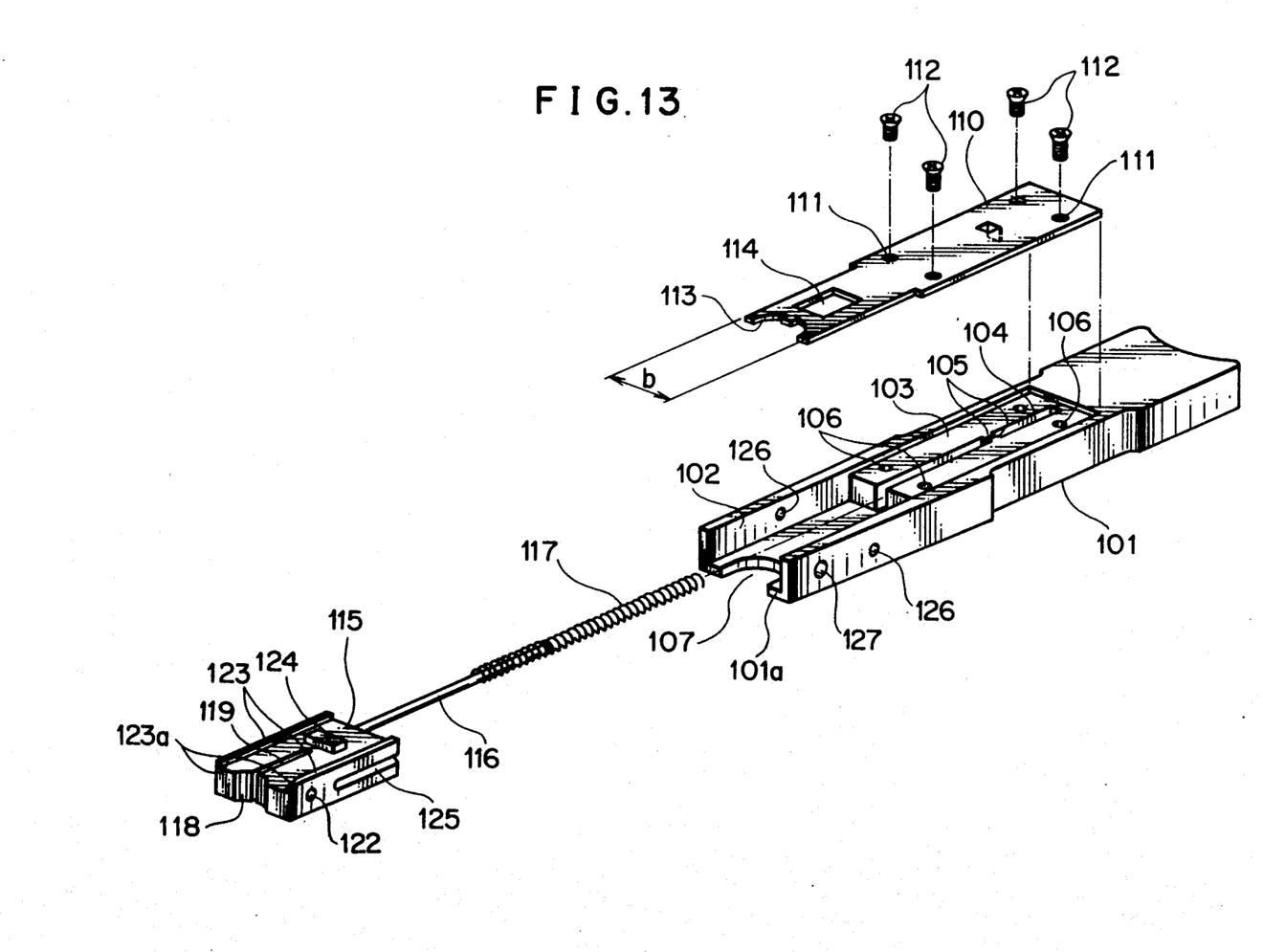
FIG. 13 is a perspective exploded view of the tool.

Referring to FIG. 13, a tool body 101 has at a front end portion 101a, which is shown at the left, a slide base accommodating recess 102 that opens toward the front and upward. At an intermediate portion of the tool body 101 is provided a shallow support member mounting recess 103 that communicates with the slide base accommodating recess 102. In the bottom of the recess 103 there is formed a longitudinally extending groove 104. At an intermediate portion of the groove 104, spring receiving projections 105 are formed protruding from both walls of the groove. Threaded holes 106 are formed in the bottom of the recess 103, two on each side of the groove 104. The front end portion 101a is formed with a notch 107 to avoid interference with a shaft, on which the E-shaped retainer ring is to be fitted.

As shown at the lower part of FIG. 9, the E-shaped retainer ring A has an opening A7 at one location of a ring plate as in conventional retainer rings. The ring A may also be formed with a recess A9 at a point on the outer circumference opposite to the opening A7 to receive the tool pressure. This is useful when mounting the retainer ring A because the tool can easily be pressed against the recess A9.

When the retainer ring A is made of a synthetic resin instead of a spring steel or spring stainless steel, it only requires a smaller pushing force to fit the ring on a shaft.

A plate-like retainer ring support member 110 is mounted in the recess 103 and is securely fixed to the retainer ring fitting tool body 101 by set screws 112 that are inserted through holes 111 cut in the support member 110 and screwed into the threaded holes 106.

The width b of the front end portion of the retainer ring support member 110 is roughly equal to the outer diameter of the retainer ring A. The support member 110 has at the front end an abutment 113 which is identical in shape with the mating surface of the ring A. The abutment 113 is located inwardly from the front end of the tool body 101 by a distance h that will just allow the E-shaped retainer ring A to be accommodated in the front part of the tool body 101 (see FIG. 9). A square hole 114 is formed in the retainer ring support member 110 at a point close to the abutment 113.

A slide base 115 to be inserted into the slide base accommodating recess 102 has at its rear end a shaft 116 that is inserted into the groove 104 (see FIGS. 10 and 11) and which has a spring 117 sleeved thereover.

At the front end of the slide base 115 is formed a recessed surface 118 that engages with the outer circumferential surface of the shaft on which the retainer ring A is to be mounted. The recessed surface 118 is formed with a slit 119 at the center.

The front part of the slide base 115 is formed, on one side of the slit 119, with a threaded hole 120 and on the other side with an insertion hole 121 so that an adjust screw 122 is passed through the hole 121 and screwed into the threaded hole 120 to adjust the width of the slit 119 (see FIG. 12).

On the upper surface of the slide base 115, clamping projections 123 protrude upwardly from the edges at each side of the slide base 115. The gap between the clamping projections 123 is almost equal to the outer diameter of the retainer ring A and can be finely adjusted by the adjust screw 122. The front part of each clamping projection 123 is tapered on the inner side so that the tapered surfaces 123a expand forwardly.

At an intermediate position between the clamping projections 123 is provided a sliding guide piece 124 that bulges upwardly from the upper surface of the slide base 115 and is adapted to fit into the square hole 114. The slide base 115 has grooves 125 formed one on each side, into which are fitted the front ends of guide screws 126 that are screwed into threaded holes in both side walls of the tool body 101.

Thus, the slide base 115 slides in the recess 102, guided by the sliding guide piece 124 and the guide screws 126 until the sliding guide piece 124 abuts against the front or rear end wall of the square hole 114. The slide base 115 is urged toward the front of the slide base accommodating recess 102 by the spring 117 interposed between the slide base 115 and the spring receiving projections 105.

A hole 127 cut in the side of the tool body 101 is for inserting a tool to adjust the adjust screw 122.

Next, the operation of the retainer ring fitting tool B of the above construction will be explained.

FIG. 9 shows the front end of the slide base 115 moved by the spring 117 almost to the front end of the tool body 101. In this condition, the E-shaped retainer ring A can be placed on the slide base 115 exposed from the abutment 113.

The distance between the clamping projections 123 is finely adjusted by the adjust screw so that they will clamp the ring A with a small pressure. The pressure receiving surface of the retainer ring A is placed in contact with the abutment 113, with both sides of the ring A clamped between the clamping projections 123.

Figure 14A:
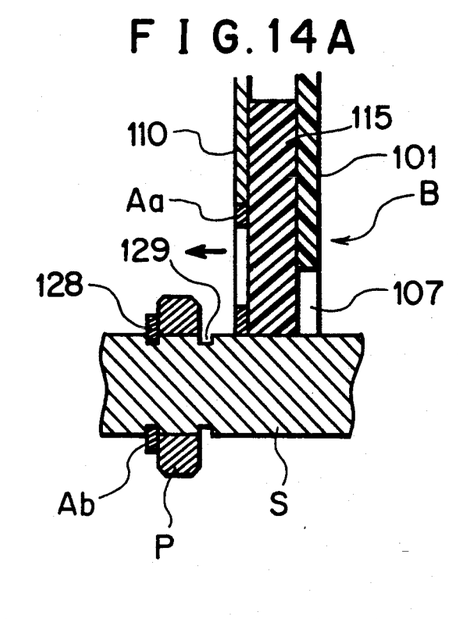
FIGS. 14A to 14C are simplified cross sections showing how the retainer ring fitting tool works.
Figure 14B:
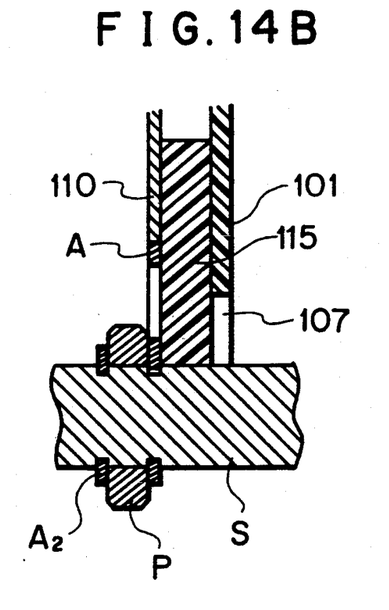

As shown in the simplified cross section of FIG. 14A, the shaft S is formed on its circumference with two annular strips of grooves 128, 129. An E-shape retainer ring C is already fitted in one of the annular groove 128 with a part P mounted on the shaft S. Suppose you wish to fit the retainer ring A in the remaining annular groove 129. The following steps should be taken. First, with the front end of the retainer ring fitting tool B lightly in contact with the shaft S, the tool B is moved toward the annular groove 129 (see FIG. 14A). The opening A7 of the retainer ring A and the recessed surface 118 of the slide base 115 move sliding on the outer circumferential surface of the shaft S until the retainer ring A comes at the annular groove 129, at which time the ring A sinks into the groove 129 (see FIG. 14B). In this way, the retainer ring A can easily be located in its mounting position.

Figure 14C:
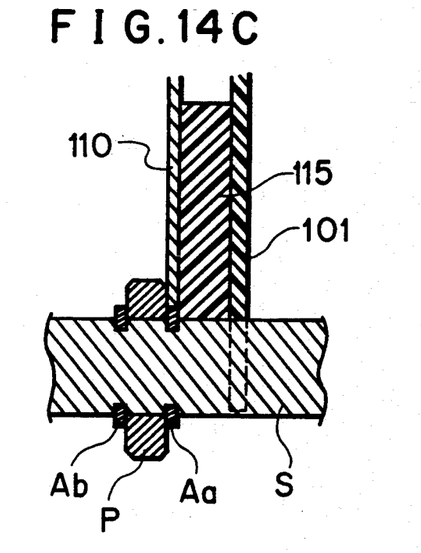

Next, the retainer ring fitting tool B is lightly pressed against the shaft S. As a result, only the slide base 115 in contact with the shaft S relatively retracts against the force of the spring 117, causing the E-shaped retainer ring A pushed by the abutment 113 to fit in the annular groove 129 (see FIG. 14C).

Figures 15, 16, 17:
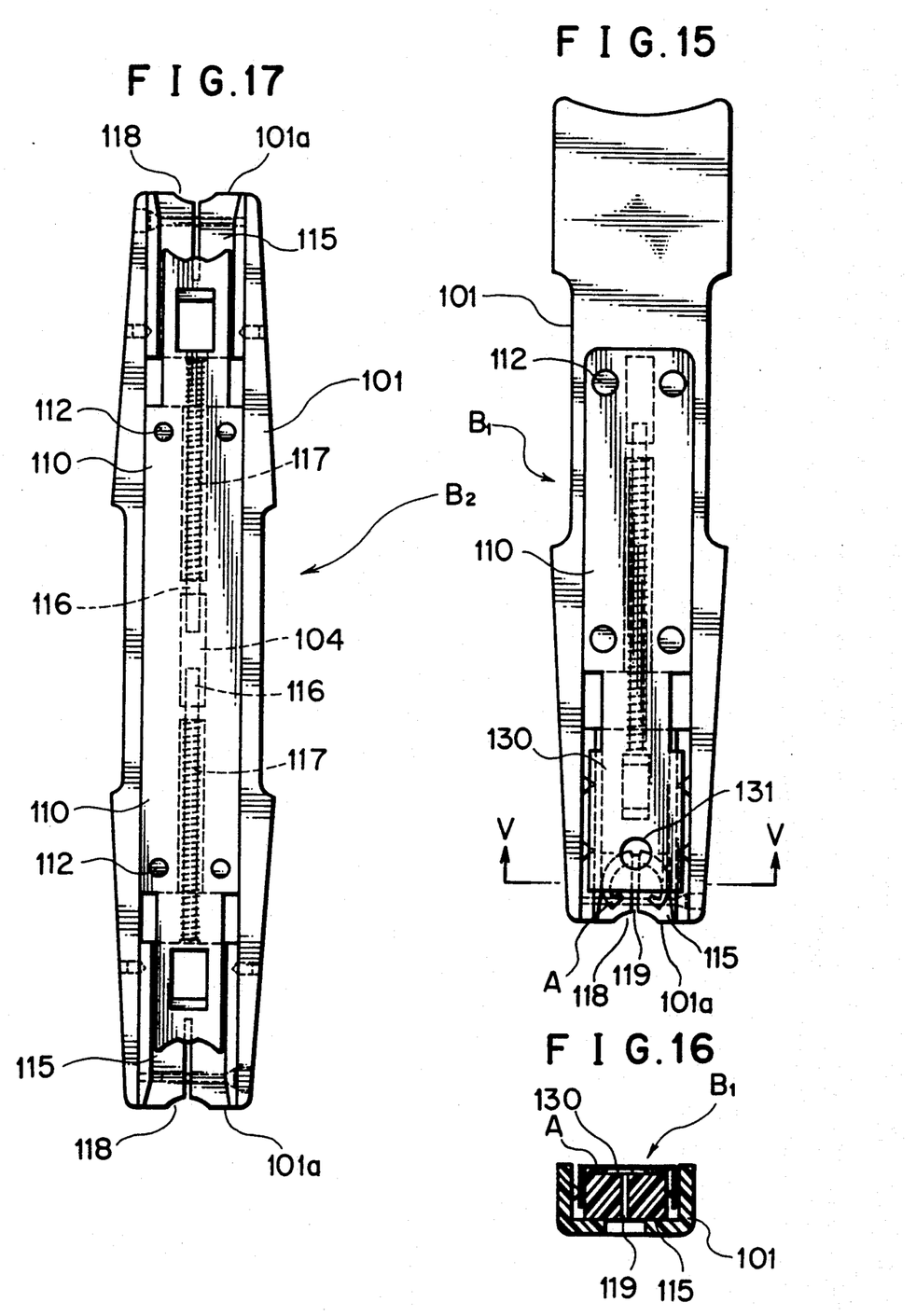
FIG. 15 is a front view of another embodiment of a retainer ring fitting tool.
FIG. 16 is a cross section taken along the line V—V of FIG. 15.
FIG. 17 is a front view of a further embodiment of a retainer ring fitting tool.

FIG. 15 shows another embodiment of a retainer ring fitting tool B1 according to this invention. FIG. 16 shows a cross section taken along the line V—V of FIG. 15.

The retainer ring fitting tool B1 has a cover 130 mounted on the upper surface of the slide base 115 to cover the front end of the retainer ring support member 110. In other respects, this embodiment has the similar construction to that of the preceding embodiment B.

The cover 130 is provided for the purpose of preventing the retainer ring A from slipping off the tool B1 in the event the ring A should get dislocated from the clamping projections 123 of the slide base 115 during the ring assembly work due to insufficient clamping force of the projections 123.

A hole 131 is provided to the cover 130 for an operator to check that the E-shaped retainer ring A is in contact with the abutment 113.

FIG. 17 is the front view of a further embodiment of a retainer ring fitting tool B2 according to this invention.

The tool B2 consists of two ring fitting tools B that are integrally connected back to back. At each end portion of the tool body 101 there is provided a slide base accommodating recess 102, a retainer ring support member 110, and a slide base 115.

Where the retainer rings A used vary in size, it is possible to fit two kinds of rings A by a single tool B2. In this case, as shown in FIG. 17, it would be advantageous if one groove 104 is commonly used in the tool body 101 and shortened to such an extent that the two opposite shafts 116 will not interfere with each other.

The invention with the above construction offers the following advantages.

(1) Because the slide base is mounted slidable on the tool body, the E-shaped retainer ring is applied with almost no external pressure when the retainer ring fitting tool is placed in contact with the outer circumferential surface of a shaft. Thus, when the front end of the tool is slid on the outer surface of the shaft, the ring will not slip off from the tool, allowing the ring to be easily positioned at the annular groove.

(2) The tool is light enough to be manipulated by one hand and a simple operation of lightly pressing the tool against the shaft enables the retainer ring to be fitted on the shaft. Thus, the assembly work is done with ease.

(3) Where the mechanism at the front end portion of the tool is provided to both ends of one tool, two different kinds of rings can be assembled with a single tool. This type of tool is advantageous when there are many kinds of E-shaped retainer rings to be assembled.

Figure 18:
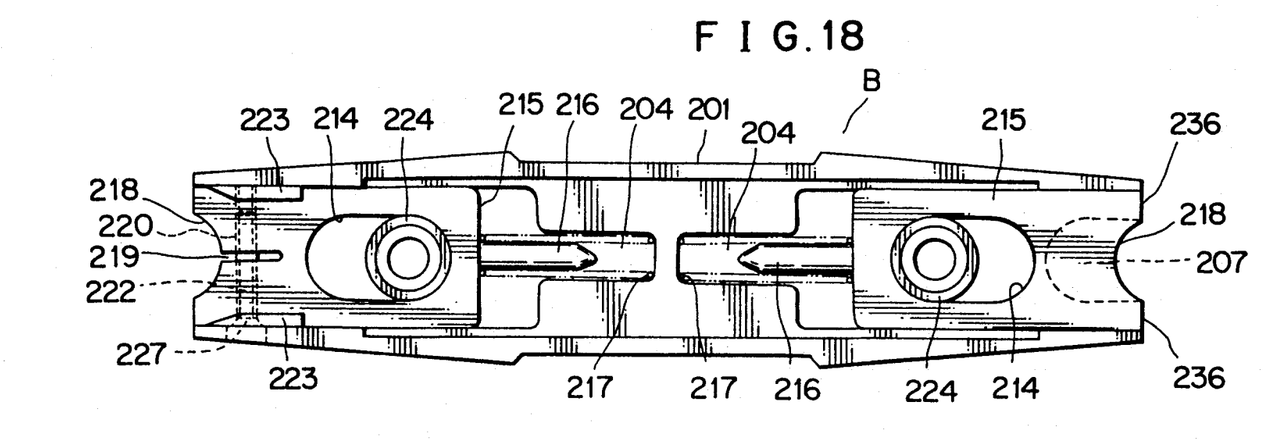
FIG. 18 is a front view of the E-shaped retainer ring fitting and removing tool with the cover removed.
Figure 19:
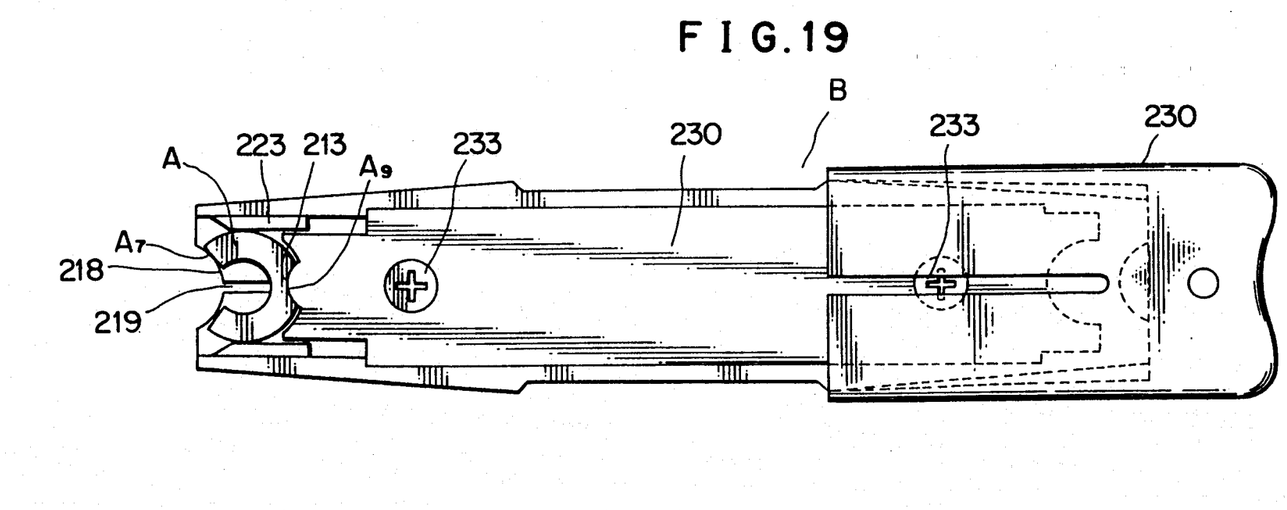
FIG. 19 is a front view of the tool.
Figure 20:
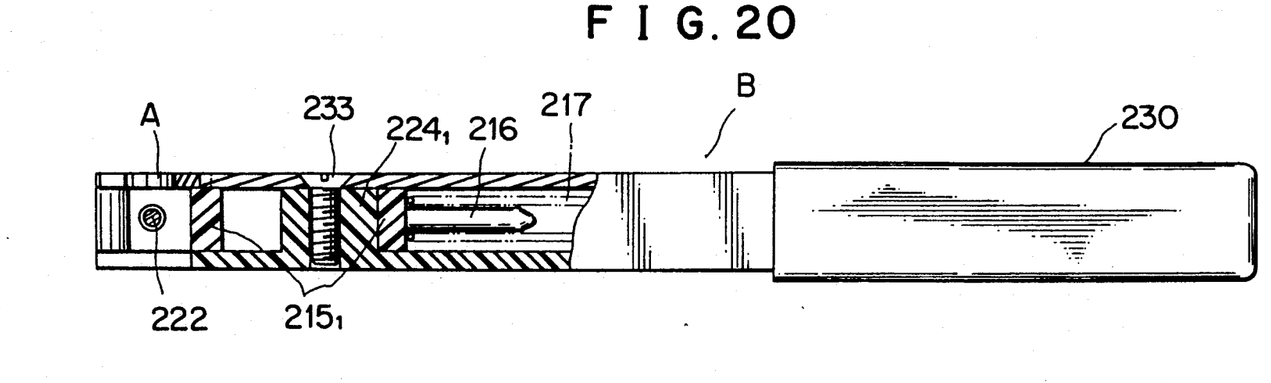
FIG. 20 is a partly cutaway side view of FIG. 19.

FIG. 19 is a front view of an E-shaped retainer ring fitting and removing tool B of this invention; FIG. 20 is a partly cutaway side view of the tool B; FIG. 18 is a front view of the tool B with the cover removed; and FIG. 21 is a perspective exploded view of the tool B.

Figure 21:
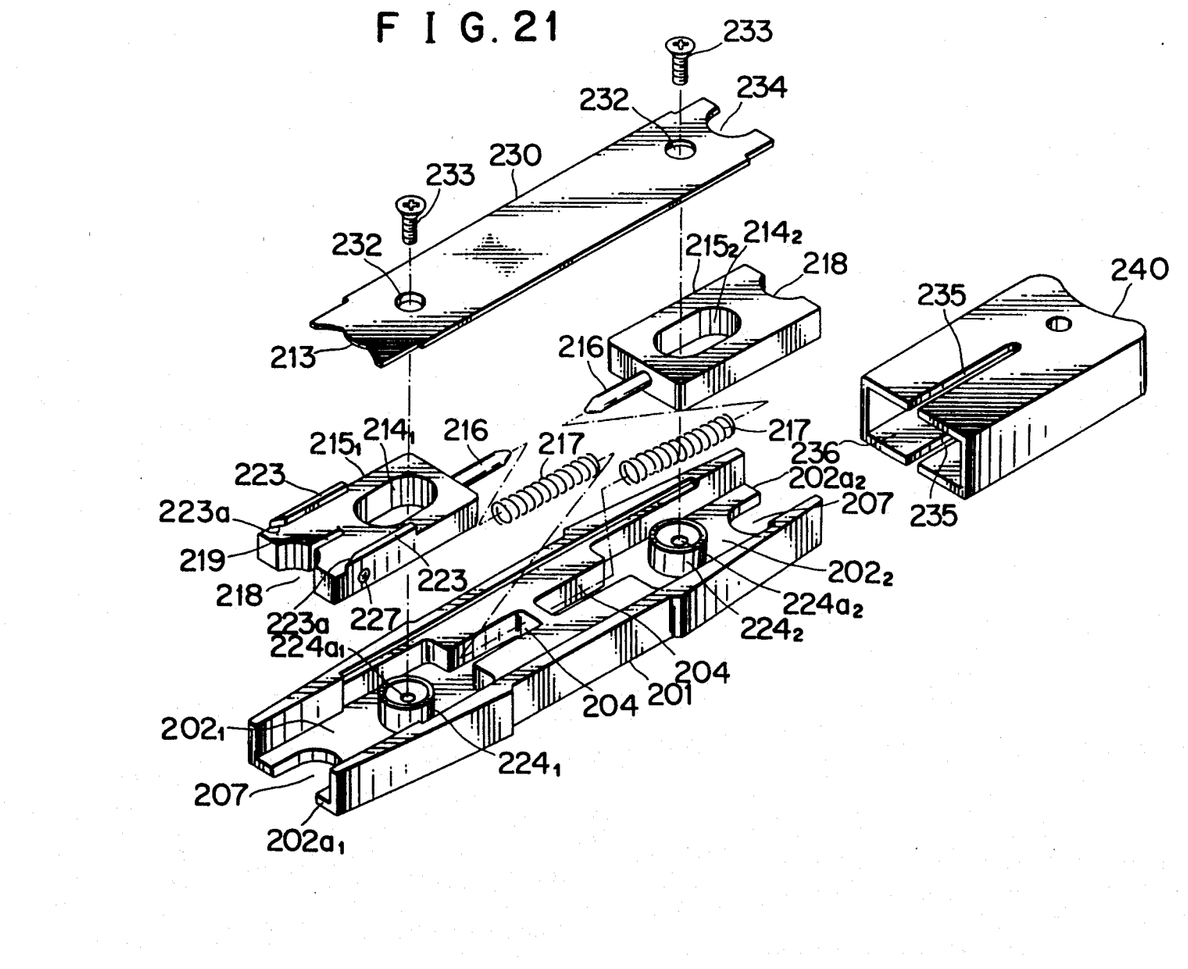
FIG. 21 is a perspective exploded view of the tool.

As shown in FIG. 21, a tool body 201 has slide base accommodating recesses $202_1$, $202_2$ that open to the ends and upward. Erected one in each recess $202_1$, $202_2$ are cylindrical stays $224_1$, $224_2$, which are formed in the core with threaded holes $224a_1$, $224a_2$ respectively.

The end portions $202a_1$, $202a_2$ of the recesses $202_1$, $202_2$ are formed with notches 207 to avoid interference with a shaft on which the E-shaped retainer ring is mounted. The recesses $202_1$, $202_2$ also have spring accommodating grooves 204 respectively on the side opposite to the end portions $202a_1$, $202a_2$.

A fitting slide base $215_1$ with a slot $214_1$ loosely sleeved over the stay $224_1$ is slidably inserted in the recess $202_1$. The slide base $215_1$ has a spring support rod 216 projecting therefrom, on which one end of a spring 217 installed in the spring accommodating groove 204 is sleeved, so that the fitting slide base $215_1$ is urged toward the end portion $202a_1$ of the recess $202_1$.

The fitting slide base $215_1$ is formed, at the end, with a semicircular recess 218 that will come into contact with a shaft on which the E-shaped retainer ring is to be fitted. The recess 218 is cut with a slit 219. The end portion is formed, on one side of the slit 219, with a threaded hole 220 extending perpendicular to the slit 219, and on the other side with a hole 221 coaxial with the threaded hole 220. A screw 222 is passed through the hole 221 and screwed into the threaded hole 220 to adjust the width of the fitting slide base $215_1$.

On both sides of the fitting slide base $215_1$, there are clamping projections 223 for clamping the E-shaped retainer ring. The clamping projections 223 each have a tapered surface 223a on the inner side at the end portion so that the tapered surfaces 223a expand toward the end.

A removing slide base $215_2$ with a slot $214_2$ loosely sleeved over the stay $224_2$ is slidably inserted in the recess $202_2$. The slide base $215_2$ has a spring support rod 216 projecting therefrom, on which one end of a spring 217 installed in the spring accommodating groove 204 is sleeved, so that the removing slide base $215_2$ is urged toward the end portion $202a_2$ of the recess $202_2$.

The removing slide base $215_2$ is formed, at the end, with a semicircular recess 218 that will come into contact with the shaft on which the E-shaped retainer ring is fitted. The end surfaces of the slide base $215_2$ on both sides of the recess 218 form press portions 236 that will be pressed against the ends of the E-shaped retainer ring at the opening.

A plate-like cover 230 has at one end an abutment 213, which is shaped into the same contour as an engagement surface of the ring opposite to the opening and which is adapted to snugly fit the ring's engagement surface. At the other end the cover 230 has a notch 234 to avoid interference with the shaft on which the E-shaped retainer ring is mounted.

The cover 230 is formed with two holes 232, through which screws 233 are inserted and screwed into the threaded holes $224a_1$, $224a_2$, thus securely fastening it to the tool body 201.

A grip cap 240 is fitted over either end of the tool B to allow it to be easily held in hand. The grip cap 240 has an accommodating recess 236 that opens toward one end, and also has slits 235 cut at that end.

Now, the action of the retainer ring fitting and removing tool B will be explained.

FITTING THE E-SHAPED RETAINER RING

As shown in FIG. 19, the E-shaped retainer ring A is placed on the surface of the fitting slide base $215_1$ and clamped between the clamping projections 223, with the engagement surface A9 of the ring A opposite to the opening A7 placed in contact with the abutment 213. The distance between the clamping projections 223 is adjusted by the screw 227 so that they lightly clamp the ring A.

Figure 22A:
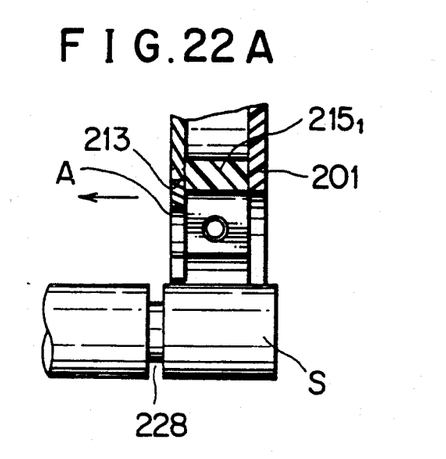
FIGS. 22A to 22C are partly cross-sectioned schematic views showing the process of fitting the ring.
Figure 22B:
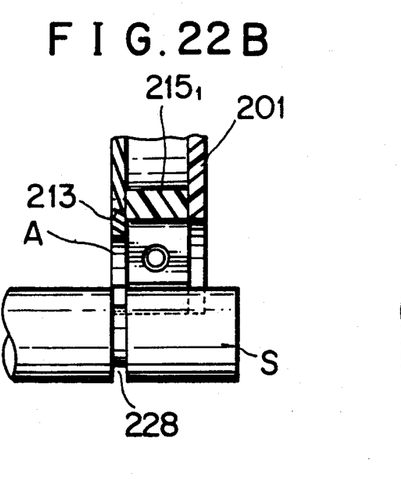

To fit the E-shaped retainer ring A in the annular groove 228 formed around the circumference of the shaft S, the following steps are taken. First, as shown in FIG. 22A, with the front end of the tool B lightly in contact with the shaft S, the tool B is moved toward the annular groove 228. The opening A7 of the ring A and the recess 218 of the fitting slide base $215_1$ move sliding on the surface of the shaft S until the ring A comes to the annular groove 228, when it sinks into the groove 228 (see FIG. 23B). In this way, the ring A can easily be located at the fitting position.

Figure 22C:
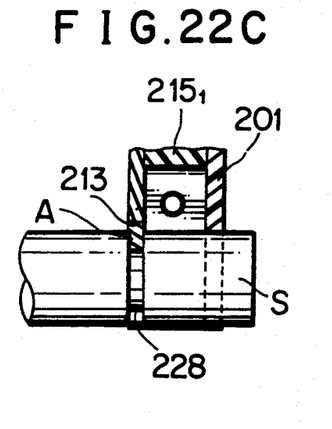

Next, the tool B is lightly pressed against the shaft S. Then, only the fitting slide base $215_1$ that is in contact with the shaft S is relatively retracted against the force of the spring 217. At the same time, the ring A is pushed by the abutment 213 to advance and fit into the annular groove 228 (see FIG. 22C).

REMOVING THE E-SHAPED RETAINER RING

Figure 23A:
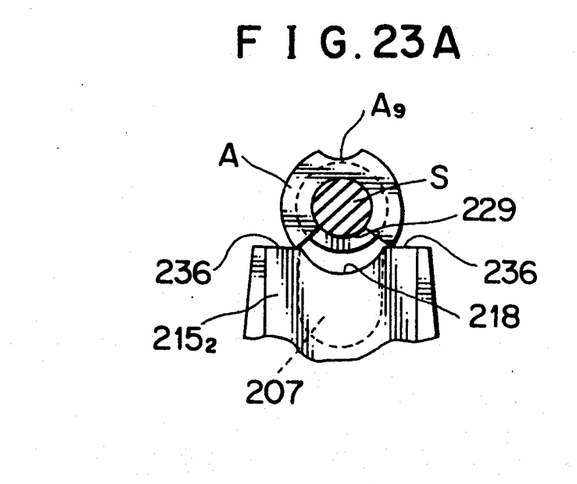
FIGS. 23A and 23B are partly cross-sectioned schematic views showing the process of removing the ring.
Figure 23B:
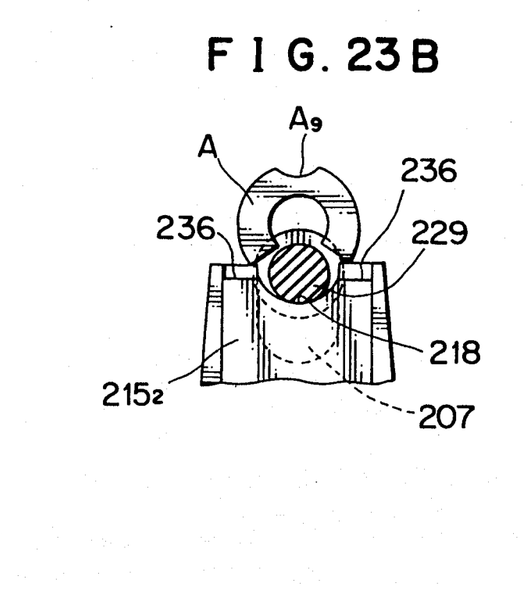

As shown in FIG. 23A, the ring A is shown mounted on the annular groove 228 of the shaft S. The press portions 236 of the removing slide base $215_2$ are pressed against the ends of the ring A at the opening A7. And the inner diameter of the ring A expands until the ring disengages from the shaft S (see FIG. 23B).

ADVANTAGES OF THE INVENTION

The invention with the above construction offers the following advantages.

(1) The retainer ring fitting and removing tool of this invention is simple in construction, small and light, and easy to grip in hand, so that the work in a narrow space of fitting and removing the ring can easily be done.

(2) In mounting the E-shaped retainer ring on a shaft, when the tool is placed in contact with the outer surface of the shaft, the ring is applied with almost no pressure. Thus, when the tool is moved in sliding contact with the surface of the shaft, the ring will not fall from the tool. The positioning of the ring at the annular groove is therefore can be carried out easily.

(3) Since the tool consists of a retainer ring fitting tool and a removing tool incorporated in one and the same body, it can be used either for fitting and removing the ring.

Fitting and removal of the ring can be done by a simple operation of pressing the tool against the shaft. The tool can thus make the hitherto difficult work very easy.

What is claimed is:

1. A generally flat E-shaped retainer ring comprising:
   a) an inner circumferential surface which engages a retainer ring accommodating groove formed around a circumference of a shaft;
   b) an outer circumferential surface which defines an outer diameter, said inner and outer circumferential surfaces defining a generally curved continuous shape;
   c) an opening through which a said shaft passes when said retainer ring is mounted or removed from said shaft;
   d) protruding front end portions formed on each side of said opening, each said protruding front end portion having an outer side, and an inner face, each said inner face diverting outwardly from said opening, each said protruding front end portion being configured such that said outer sides are spaced apart a distance approximating said outer diameter;
   e) said inner circumferential surface, said outer circumferential surface, each said protruding front end portions and said flat E-shaped retainer lying in the same plane; and
   f) whereby said generally flat E-shaped retainer ring is removed through elastic deformation from a said shaft by pressing a tool against said protruding end portions of said retainer ring.

2. The generally flat E-shaped retainer ring of claim 1 wherein each said protruding end portion and outwardly diverging inner face include a distal end having a surface to be contacted by said tool, and each inner face is longer than a generally radial distance between said inner circumferential surface and said outer circumferential surface such that said E-shaped retainer ring requires a smaller pressing force by said tool to be applied to said distal ends to remove said E-shaped retainer ring from said shaft.

* * * * *